United States Patent [19]

Cesare et al.

[11] Patent Number: 4,919,976

[45] Date of Patent: Apr. 24, 1990

[54] INSULATING ADHESIVE TAPE COMPOSITION AND COMPOSITES THEREOF

[75] Inventors: Frank C. Cesare, Woodbury; Robert G. Davis; William D. Sigworth, both of Naugatuck, all of Conn.

[73] Assignee: Uniroyal Chemical Company, Inc., Middlebury, Conn.

[21] Appl. No.: 348,840

[22] Filed: May 8, 1989

Related U.S. Application Data

[63] Continuation of Ser. No. 88,495, Aug. 17, 1987, abandoned, which is a continuation of Ser. No. 769,208, Aug. 23, 1985, abandoned.

[51] Int. Cl.$^5$ ............................................. B05D 3/02
[52] U.S. Cl. .................................. 427/373; 156/334; 427/379; 427/388.2; 428/317.5; 428/349; 428/352; 526/114
[58] Field of Search .................... 427/373, 388.2, 379; 156/334; 428/317.5, 349, 352; 526/114

[56] References Cited

U.S. PATENT DOCUMENTS

| | | | |
|---|---|---|---|
| 3,819,592 | 6/1974 | Visser | 526/113 X |
| 4,536,441 | 8/1985 | Schmeer et al. | 428/317.3 |
| 4,543,139 | 9/1985 | Freedman | 156/152 |

OTHER PUBLICATIONS

Kalox TM Sales Material, Hardman Chemical Co.

*Primary Examiner*—Michael Lusignan
*Attorney, Agent, or Firm*—Glenn E. Karta

[57] ABSTRACT

Adhesive tapes comprised of a curable composition comprising: (A) at least one polymer selected from the group consisting of ethylene/alphaolefin copolymer, ethylene/alphaolefin/nonconjugated polyene terpolymer, polyacrylate, polymethacrylate, polyisoprene, polyacrylonitrile, polymethacrylonitrile and polybutadiene, said polymer having a number average molecular weight of between about 500 and about 14,000; (B) an effective amount of curative having an activation temperature of at least about 100° C; and (C) (optionally) a blowing agent possess admirable qualities for use as insulating compositions. Also disclosed are composites comprised of a substrate having cured insulating tape compositions adhered thereto.

9 Claims, No Drawings

INSULATING ADHESIVE TAPE COMPOSITION AND COMPOSITES THEREOF

This is a continuation of application Ser. No. 088,495 filed Aug. 17, 1987 and which is a continuation of application Ser. No. 769,208 filed Aug. 23, 1985 both are abandoned.

FIELD OF THE INVENTION

This invention relates to a composite comprised of (I) a suitable substrate, and (II) a cured tape composition comprised of (A) at least one low molecular weight polymer selected from the group consisting of ethylene/alphaolefin copolymer, ethylene/alphaolefin/nonconjugated polyene terpolymer, polyacrylate, polymethacrylate, polyisoprene, polyacrylonitrile, polymethacrylonitrile and polybutadiene; (B) an effective amount of curative; and (C) (optionally) an effective amount of blowing agent; adhered thereto. In addition, this invention relates to the uncured tape used to form such composites.

BACKGROUND OF THE INVENTION

The use of certain cured polymeric materials for thermal and/or sonic insulation has long been recognized in the construction and automotive fields. In the past, it has been known to apply such insulation in the form of a cured or uncured tape or membrane.

A problem generally encountered with the insulative tapes that have been employed in the past, is that while the uncured polymeric material may possess desirable tack, the cured materials, in and of themselves, possess little or no adhesiveness to the substrate. Consequently, the use of adhesives is required in order to bond the cured material to the substrate to be insulated—a requirement which adds additional expense and frequently involves increased difficulty of application. Thus, it would be desirable to possess an insulating tape composition which, upon curing, would exhibit desirable adhesion to the substrate to be insulated.

Accordingly, it is an object of this invention to provide a curable tape useful for thermal and/or sonic insulation which, upon curing, exhibits desirable adhesion to the substrate to be insulated.

It is a further object of this invention to provide a composite comprised of such cured tape and a suitable substrate.

The foregoing and additional objects will become more evident from the following description and Examples.

DESCRIPTION OF THE INVENTION

In one aspect, this invention is directed to a composite comprised of:
(I) a suitable substrate; and
(II) a cured tape composition comprising:
(A) at least one polymer selected from the group consisting of ethylene/alphaolefin copolymer, ethylene/alphaolefin/nonconjugated polyene terpolymer, polyacrylate, polymethacrylate, polyisoprene, polyacrylonitrile, polymethacrylonitrile and polybutadiene; said polymer having a number average molecular weight of between about 500 and about 14,000; and
(B) an effective amount of curative having an activation temperature of at least about 100° C.;
adhered thereto.

In another aspect, this invention relates to a curable insulating tape composition comprising:
(A) at least one polymer selected from the group consisting of ethylene/alphaolefin copolymer, ethylene/alphaolefin/nonconjugated polyene terpolymer, polyacrylate, polymethacrylate, polyisoprene, polyacrylonitrile, polymethacrylonitrile and polybutadiene; said polymer having a number average molecular weight of between about 500 and about 14,000; and
(B) an effective amount of curative having an activation temperature of at least about 100° C.

Preferably, the insulating curable tape of this invention further comprises an effective amount of gas evolution blowing agent having an effective temperature which is less than or about equal to the curing temperature of the curative, such that the cured tape component of the composite of this invention is a foamed material.

As is employed herein, the word "tape" is defined to mean a membrane which possesses sufficient flexibility so that it can be coiled about a 0.5 inch diameter without damage to its structural integrity, such as cracking or tearing.

Suitable substrates for the composites of this invention are materials which can withstand curing temperatures and to which the uncured compositions of this invention may be adhered. Illustrative of suitable substrates are metals, such as aluminum, steel, chrome and the like; carbon fibers; high softening point thermoplastics: and thermosetting materials with exhibit dimensional stability at curing temperatures.

The low molecular weight polymer employed in the composition of this invention comprises at least one member selected from the group consisting of ethylene/alphaolefin copolymer, ethylene/alphaolefin/nonconjugated polyene terpolymer, polyacrylate, polymethacrylate, polyisoprene, polyacrylonitrile, polymethacrylonitrile and polybutadiene. The most preferred polymers are ethylene/alphaolefin copolymers and ethylene/alphaolefin/nonconjugated polyene terpolymer.

The polyacrylate, polymethacrylate, polyisoprene, polyacrylonitrile, polymethacrylonitrile and polybutadiene polymers which are employable in this invention may be homopolymers of these monomers or copolymer additionally comprising a minor amount of another monomer or monomers having vinyl unsaturation. Moreover, these polymers may be hydrogenated or nonhydrogenated. As is employed herein, the acrylate and methacrylate monomers employed in the polymethacrylate polymers of this invention are compounds of the formulae $CH_2=CHCOOR^1$ and $CH_2=C(CH_3)COOR^1$ respectively, wherein $R^1$ is an alkyl radical comprised of 1 to 4 carbon atoms.

The ethylene/alphaolefin copolymers which may be employed in the practice of this invention are copolymers of ethylene and at least one alphaolefin having the formula $H_2C=CHR$, wherein R is a linear or branched alkyl radical containing from 1 to 10 carbon atoms. Preferably, R is a $C_1$-$C_8$ alkyl radical. The most preferred alphaolefins are propylene, 1-butene and 1-pentene. In one preferred embodiment, the ethylene/alphaolefin polymers further comprise alkyl- and/or aryl-substituted norbornene.

The ethylene/alphaolefin/nonconjugated polyene terpolymers which may be employed are polymers of ethylene, at least one alphaolefin (of the formula $H_2C=CHR$, wherein R is a linear or branched alkyl radical comprised of from 1 to 10 carbon atoms) and at least one copolymerizable nonconjugated polyene. Illustrative of the nonconjugated polyenes which may be employed are aliphatic dienes such as 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, exo- and endodicyclopentadiene and the like; exo- and endo-alkenylnorbornenes, such as 5-propenyl-, 5-(buten-2-yl)-, and 5-(2-methylbuten-[2']-yl)norbornene and the like; alkylalkenylnorbornenes, such as 5-methyl-6-propenylnorbornene and the like; alkylidenenorbornenes, such as 5-methylene-, 5-ethylidene-, and 5-isopropylidene-2-norbornene, vinylnorbornene, cyclohexenylnorbornene and the like; alkylnorbornadienes, such as methyl-, ethyl-, and propylnorbornadiene and the like; and cyclodienes such as 1,5-cyclooctadiene, 1,4-cyclooctadiene and the like. The preferred nonconjugated polyenes are 5-ethylidene-2norbornene, 1,4-hexadiene and dicyclopentadiene.

The ethylene content of the ethylene/alphaolefin copolymers and of the ethylene/alphaolefin/nonconjugated polyene terpolymers which may be employed in the present invention is generally between about 25% and about 85%, is preferably between about 30% and about 75%, and is most preferably between about 40% and about 70% by weight. The polyene content of such terpolymers is generally below about 25%, and is preferably between about 2 and about 20% by weight.

Moreover, the low molecular weight polymers of the tape of this invention may have incorporated therein and/or at the terminals thereof functional groups such as halogen, sulfo, sulfino, sulfinyl, cyano, epoxy, hydroxy, carboxy, COOR, $Si(OR^2)_3$, $Si(OOCR^2)_3$ ($R^2$ being a hydrocarbyl radical having 1–18 carbon atoms) and the like. Such functional groups may be introduced either by replacement, addition or graft polymerization reactions well known to those skilled in the art of polymerization.

The polymers employed in this invention generally possess a number average molecular weight of between about 500 and about 14,000. A molecular weight range of between about 2,000 and about 10,000 is preferred, and a molecular weight range of between about 4,000 and about 7,000 is most preferred.

As is employed in the claims herein, the term "curative" emcompasses both curatives and curative systems. As is well known to those skilled in the art, the particular curative that may be employed in a given composition is generally governed by the availability of unsaturation and/or functional groups which are present in a given low molecular weight polymer. A wide variety of curatives and curing systems may be employed where applicable, such as free radical generating agents such as aromatic and aliphatic peroxides, including, for example, aromatic diacyl peroxides and aliphatic diacyl peroxides, dibasic acid peroxides, ketone peroxides, alkyl peroxyesters and alkyl hydroperoxides. Specific nonlimiting examples of such peroxides and hydroperoxides are diacetylperoxide; dibenzoylperoxides; bis-2,4-dichloro benzoyl peroxide; ditert.-butyl peroxide; dicumylperoxide; tert.-butylperbenzoate; tert.-butylcumyl peroxide; 2,5-bis-(tert.-butylperoxy)-2,5-dimethylhexane; 2,5-bis-(tert.-butylperoxy)-2,5-dimethylhexyne-3; 4,4,4',4'-tetra-(tert.-butylperoxy)-2,2-dicyclohexyl-propane; 1,4-bis-(tert.-butylperoxy-isopropyl)-benzene; 1,1-bis-(tert.-butylperoxy)-3,3,5-trimethylcyclohexane; lauroyl peroxide; succinic acid peroxide, cyclohexanone peroxide; tert.-butyl peracetate and butyl hydroperoxide.

Also suitable, in appropriate circumstances, are azide curing agents including azidoformates, such as tetramethylenebis(azido-formate) and the like; aromatic polyazides, such as 4,4'-diphenylmethane diazide and the like; and sulfonazides such as p,p'-oxybis(benzene sulfonyl azide) and the like. Other curatives that may be used include the aldehydeamine reaction products such as formaldehyde-ammonia, formaldehyde-ethylchlorideammonia, acetaldehyde-ammonia, formaldehyde-aniline, butyraldehyde-aniline, heptaldehyde-aniline, heptaldehyde-formaldhyde-aniline, hexamethylenetetramine, alpha-ethyl-beta-propylacrolein-aniline and the like; substituted ureas, such as trimethylthiourea, diethylthiourea, dibutylthiourea, tripentylthiourea, 1,3-bis(benzothiazolyl-mercaptomethyl)urea, N,N-diphenylthiourea and the like; guanidines, such as diphenylguanidine, di-o-tolylguanidine, diphenylguanidine phthalate, the di-o-tolylguanidine salt of dicatechol borate and the like; xanthates, such as zinc ethylxanthate, sodium isopropylxanthate, butylxanthic disulfide, potassium isopropylxanthate, and zinc butylxanthate and the like; dithiocarbamates, such as copper dimethyl-, zinc dimethyl-, tellurium diethyl-, cadmium dicyclohexyl-, lead dimethyl-, selenium dibutyl-, zinc pentamethylene-, zinc didecyl-, zinc isopropyloctyldithiocarbamate and the like; thiazoles, such as 2-mercaptobenzothiazole, zinc mercaptothiazolyl mercaptide, 2-benzothiazoly-N,N-diethylthiocarbamyl sulfide, 2,2'-dithio-bis(benzothiazole) and the like; imidazoles, such as 2-mercaptoimidazoline, 2-mercapto-4,4,6-trimethyl-dihydropyrimidine) and the like; sulfenamides such as N-t-butyl-2-benzothiazole-, N-cyclohexylbenzothiazole-, N,N-diisopropyl-benzothiazole-, N-(2,6-dimethylmorpholino)-2-benzo-thiazole-sulfenamide and the like; thiuramdisulfides, such as N,N'-diethyl-, tetrabutyl-, N,N'-diisopropyldioctyl-, tetramethyl-, N,N'-dicyclohexyl-, N,N'-tetralaurylthiuramidsulfide and the like: paraquinonedioxime, dibenzoparaquinonedioxime and the like; and sulfur itself. (See Encyclopedia of Chemical Technology, vol. 17, 2nd edition, Interscience Publishers, 1968; also Organic Peroxides, Daniel Swern, vol. 1, Wiley-Interscience, (1970).

When a peroxide curative is employed, such curative may be used alone or with auxiliary substances such as sulfur; maleimides, including bis-maleimides; polyunsaturated compounds, such as cyanurate and the like; acrylic esters, such as trimethylolpropane trimethacrylate and the like; organic transition metal salts, such as cobalt octoate, cobalt naphthenate, copper stearate, chromium laurate and the like; and tertiary amines, such as tributylamine, and dimethyloctylamine and the like.

When using sulfur as a curative (whether in its elemental form or in the form of a sulfur donor). it is desirable to include an accelerator and an activator (e.g., a metal salt or oxide).

Mixed peroxide-type or mixed-sulfur-type curing systems may be employed. These include dicumylperoxide plus 2,5-bis-(tert.-butylperoxy)-2,5-dimethylhexane or sulfur plus tetramethylthiuramidisulfide plus dicumyl peroxide. See "Vulcanization and Vulcanizing Agents," W. Hoffman, Palmerton Publishing Co., New York, 1967, for an extensive disclosure of curing agents.

As has been stressed above, the selection of the most preferred curative for any given composition will depend upon the characteristics of the polymers to be cured, and, further, that such selection is well known and/or is easily determined by those skilled in the art using routine experimentation. However, in order to eliminate the danger of premature curing, the curative employed should possess an activation of at least about 100° C., preferably of at least about 200° C., and most preferably of at least about 300° C.

The curatives of the composition of this invention are present in an amount effective to cure the polymer of such composition. Typically, such curatives will be present in amounts of between about 0.5 and about 5 part by weight per 100 parts of polymer.

The compositions of this invention preferably additionally comprise a blowing agent. Blowing agents which may be employed in the practice of this invention include inert compounds which readily turn from a liquid to a gaseous state upon heating to curing temperature range such as (optionally halogenated—particularly fluorinated) hydrocarbons including pentane, hexane and octane; or solid chemical blowing agents which upon heating decompose thereby releasing gases such as $CO_2$, $N_2$ and the like. The latter blowing agents include sodium bicarbonate, azodicarbonamide, benzenesulfonyl hydrazide, toluenesulfonyl hydrazide, dinitrosopentamethylenetetramine, oxybis(p-benzenesulfonyl hydrazide) alone or in combination with activating agents therefore such as zinc oxide, metal salts of sulfuric acids such as zinc bis(toluenesulfinic acid), potassium dodecanesulfinic acid, activated urea, stearic acid, poly(ethylene ether)glycol and others. Such blowing agents are typically present in amounts of between about 0.1 and 10 parts by weight, based on per hundred parts by weight of low molecular weight polymers.

It is important to choose a blowing agent or blowing agent system whose gasification or decomposition temperature or temperature range is below that of, or at least approximately equal to the activation temperature or temperature range of the curative employed, thereby ensuring that excessive premature curing does not occur.

If so desired, a processing aid may be added to the composition. Illustrative of suitable processing aids are low molecular weight amorphous polypropylene, polybutene, bitumen or processing or extender oils such as naphthenic or paraffinic oils; also waxes such as microcrystalline paraffinic wax may be added.

Other ingredients which may be added to the instant compositions include antioxidants, antiozonants, ultraviolet light stabilizers, tackifiers, pigments, colorants, fire retardants, surfactants and the like. It is to be noted that although adhesives are not required to bind the cured tape to the substrate of the composite of this invention, minor amounts of adhesives may be incorporated into the composition of this invention if desired.

It is often advantageous to include a dense filler in the composition of this invention, particularly when a foaming agent is additionally employed. This is because the resultant foamed composition will possess both air pockets (which reduce high frequency vibrational noise) and dense materials (which reduce low frequency vibrational noise) and will therefore produce a superior sonic insulating composition. Illustrative of suitable fillers are materials such as carbon black, clay, pumice, talc, calcium carbonate, silica, silicates, barytes and metal oxides such as $TiO_2$.

It is preferred that thorough dispersion of the components of this invention be achieved. However, because the low molecular weight polymers employed in the practice of this invention are generally viscous, high shear mixing is usually required. Such high shear mixing may be accomplished employing suitable mixers such as homogenizers, dispersers and sigma blade mixers. Mixing may be done at room temperature or elevated (e.g., between about 30° and about 175° C.) temperature so long as such mixing temperature is below the curing (and, if applicable foaming) temperature of the composition.

Preferably, all the ingredients except the blowing agent, if one is to be employed, are first blended together until an essentially homogeneous composition is obtained, it being understood that the mixing temperature should be maintained below the activation temperature of the curative. Thereafter, the blowing agent may be blended into the mixture while taking care that the mixing temperature remains well under the decomposition or gasification temperature of the blowing agent.

For adjusting the viscosity of the composition, usually after the other components have been added, minor amounts of solvent may be employed. Any compatible solvent may be used, the most common being aliphatic and aromatic hydrocarbons such as hexane, naphtha, toluene and xylene.

The mixed composition may be formed into a tape by any conventional means well known to those skilled in the art, such as extrusion, casting, etc. The tape is then typically sized into the desired dimensions and coiled or otherwise processed into desirable form for shipping.

Due to the tackiness of the uncured tapes of this invention, it is preferable to apply a release film to the surfaces of the tape. Such release film may be composed of any material which can be easily removed from the tape prior to application without destroying the structural integrity of such tape. Illustrative of the release films which may be employed are polymeric films of materials such as polyamide copolymer or vinyl acetate copolymer.

The uncured tapes of this invention are typically employed as follows. The desired amount of tape is unwound from the tape coil. The appropriate length of tape is easily severed from such coil, e.g. by tearing or cutting with scissors, without the stringiness associated with several prior art compositions being encountered. The release film is removed from the tape, and the tape is adhered to the desired substrate. The tape is then cured (and, if appropriate expanded) by exposing such assembly to curing (and, if appropriate, expansion) conditions, thereby forming the composite of this invention.

The compositions of this invention, particularly when they are comprised of ethylene/alphaolefin copolymer or ethylene/alphaolefin/nonconjugated polyene terpolymer, provide a versatility of applications where, in order to achieve sealing, sound deadening, thermal insulation, etc., it is essential that the material employed is curable (and often foamable) yet excels in ozone resistance, heat resistance, inertness to surrounding material, flexibility even at low (e.g., −150° C. or lower) temperature. Moreover, because of the relatively low maximum tensile strength exhibited by the compositions of this invention in the absence of any filler, it is believed that the compositions of this invention may comprise increased amounts of such dense filler without becoming undesirably brittle. Because of such properties, the compositions of this invention are admirably suited for many automotive uses including rust proofing of car doors, trunk lid seals, undercoating, noise reducing layers on the underside of car hoods or trunk lids, and the like where the compositions of this invention may be cured (and foamed) while simultaneously heat treating car body paint. Moreover, the materials of this invention are useful in many facets of the construction industry, or generally wherever sonic and/or thermal insulation is desired.

EXAMPLES

The following Examples are provided to further illustrate the invention and are not intended to limit the scope of the invention in any manner.

In the following Examples, certain ingredients were employed, which ingredients are characterized as follows:

POLYMERS

| Name | $\overline{M_n}$ | Iodine No. | Ethylene/Propylene Weight Ratio |
|---|---|---|---|
| EPDM 1* | 7800 | 22 | 43/57 |
| EPDM 2* | 6600 | 19 | 49/51 |

*Both EPDM's contained dicyclopentadiene as a termonomer

ADDITIVES
Nirez 1040 ™: a tackifier comprised of terpene polymers
MBT ™: 2-mercaptobenzothiazole
Tellurac ™: Tellurium Diethyldithiocarbamate
Tetrone A ™: Dipentamethylenethiuram hexasulfide
Methazate ™: Zinc Dimethyldithiocarbamate

EXAMPLES 1–4

Several masterbatches, each containing the components in the amounts listed in grams in Table I below, were mixed in the Prep Center ™ (manufactured by C. W. Brabender Instruments, Inc.; Type GP 100) with azodicarbonamide added early in the mixing cycle to maximize dispersion. Curatives were added about 5 to 10 minutes after introduction of the last masterbatch reagent. Mixing was continued for 10 minutes after addition of the last curative. The samples were cold pressed into 1″×1″×¼″ squares and heated at 170° for 30 minutes. The precure and postcure physical characteristics of the Examples are summarized in Tables II and IIb below.

TABLE I

| Example | 1 | 2 | 3 | 4 |
|---|---|---|---|---|
| EPDM 1 | 121.8 | 121.8 | 0 | 0 |
| EPDM 2 | 0 | 0 | 121.8 | 121.8 |
| N330 Carbon Black* | 30.4 | 30.4 | 30.4 | 30.4 |
| Calcium Carbonate** | 103.5 | 103.5 | 103.5 | 103.5 |
| Nirez 1040 | 18.3 | 18.3 | 18.3 | 18.3 |
| Zinc Oxide | 6.1 | 6.1 | 6.1 | 6.1 |
| Stearic Acid | 2.4 | 2.4 | 2.4 | 2.4 |
| Azodicarbonamide*** | 7.3 | 7.3 | 7.3 | 7.3 |
| Curatives | | | | |
| MBT | 11.8 | 1.8 | 1.8 | 1.8 |
| Tellurac | 1.2 | 1.8 | 1.2 | 1.8 |
| Tetrone A | 1.8 | 2.4 | 1.8 | 2.4 |
| Methazate | 1.2 | 1.8 | 1.2 | 1.8 |
| Sulfur | 3.2 | 3.2 | 3.2 | 3.2 |

*Average particle size 28 micrometers
**Particle size 3.3 microns
***Celogen AZ-150 ™

TABLE IIa

| EXAMPLE | PRECURE DIMENSIONS (IN) | POSTCURE DIMENSIONS (IN) | PRECURE VOL (IN³) | POSTCURE VOL (IN³) | VOLUME GAIN (AS % PRECURE VOL) |
|---|---|---|---|---|---|
| 1 | 0.94 × 0.98 × 0.24 | 1.08 × 1.12 × 0.34 | 0.21 | 0.41 | 95.2 |
| 2 | 0.94 × 0.96 × 0.24 | 1.08 × 1.06 × 0.32 | 0.22 | 0.37 | 68.2 |
| 3 | 1.00 × 1.00 × 0.24 | 1.16 × 1.18 × 0.40 | 0.24 | 0.54 | 116.7 |
| 4 | 1.04 × 1.06 × 0.24 | 1.20 × 1.20 × 0.38 | 0.26 | 0.54 | 107.7 |

TABLE IIb

| EXAMPLE | PRECURE WEIGHT (GM) | POSTCURE WEIGHT (GM) | WEIGHT LOSS (GM) | WEIGHT LOSS (%) | PRECURE DENSITY (G/IN$^{-3}$) | POSTCURE DENSITY (G/IN$^{-3}$) | DENSITY LOSS (% PRECURE DEN.) |
|---|---|---|---|---|---|---|---|
| 1 | 5.3784 | 5.2871 | 0.0913 | 1.70 | 25.61 | 12.90 | 49.6 |
| 2 | 5.3440 | 5.2529 | 0.0911 | 1.70 | 24.29 | 14.20 | 41.5 |
| 3 | 5.5290 | 5.4344 | 0.0946 | 1.71 | 23.04 | 10.06 | 56.3 |
| 4 | 5.9772 | 5.8722 | 0.1050 | 1.75 | 22.99 | 10.87 | 52.7 |

EXAMPLE 5 and 6

Following the procedure in Example 1–4, two additional masterbatches were prepared, each containing the components listed in grams in Table III below:

TABLE III

| EXAMPLE | 5 | 6 |
|---|---|---|
| EPDM 2 | 121.8˙ | 121.6 |
| N 330 Carbon Black | 30.4 | 30.4 |
| Calcium Carbonate | 103.5 | 103.5 |
| Nirez 1040 | 18.3 | 18.3 |
| Zinc Oxide | 6.1 | 6.1 |
| Stearic Acid | 2.4 | 2.4 |
| Azodicarbonamide | 10.9 | 14.6 |
| Curatives | | |
| MBT | 1.8 | 1.8 |
| Ethyl Tellurac | 1.2 | 1.2 |
| Tetrone A | 1.8 | 1.8 |
| Methazate | 1.2 | 1.2 |
| Sulfur | 3.2 | 3.2 |

The material were cold pressed as described in Examples 1–4. Squares were heated at 170° C. for 30 minutes and the physical properties measured. The results are summarized in Tables IVa and IVb.

TABLE IVa

| EXAMPLE | PRECURE DIMENSIONS (IN) | POSTCURE DIMENSIONS (IN) | PRECURE VOL (IN³) | POSTCURE VOL (IN³) | VOLUME GAIN (AS % PRECURE VOL) |
|---|---|---|---|---|---|
| 5 | 0.98 × 1.00 × 0.24 | 1.10 × 1.20 × 0.42 | 0.24 | 0.55 | 129.2 |
| 6 | 1.00 × 1.04 × 0.24 | 1.20 × 1.26 × 0.50 | 0.25 | 0.76 | 204.0 |

TABLE IVb

| EXAMPLE | PRECURE WEIGHT (GM) | POSTCURE WEIGHT (GM) | WEIGHT LOSS (GM) | WEIGHT LOSS (%) | PRECURE DENSITY (G/IN$^{-3}$) | POSTCURE DENSITY (G/IN$^{-3}$) | DENSITY LOSS (% PRECURE DEN) |
|---|---|---|---|---|---|---|---|
| 5 | 6.7447 | 6.6052 | 0.1395 | 2.07 | 28.10 | 12.01 | 57.2 |
| 6 | 7.2672 | 7.2672 | 0.1675 | 2.25 | 29.74 | 9.56 | 67.9 |

EXAMPLES 7 AND COMPARATIVE EXPERIMENT A

In order to obtain a measurement of the adhesion of the material of this invention to an aluminum substrate with which the sample was not originally in contact, a sample square (approximately 1"×1"×¼") of the material of Example 6 was placed in an aluminum pan. A second aluminum pan was placed on top, with the support of four screws as legs. A small gap existed between the top of the sample and the bottom of the top pan. The top pan was filled with additional weights to provide resistance against lifting by the expanding sample during cure. The sample was placed in an oven at 170° for 30 minutes. Upon cooling, weights were suspended from the termini of a diameter of the bottom pan, and the assembly attached by the top pan such that the weight of the bottom pan, leg screws, sample, and suspended weights came to bear on the two adhesion surfaces (i.e., the sample/top pan interface and the sample/lower pan interface).

The weight of sample, bottom pan and leg screws was 19.2 grams. The adhesion surfaces supported loads of up to 419.2 grams for a period of one minute without failure. At a total weight of 519.2 grams, adhesion failed after 30 seconds.

In contrast, when an identical sample employing Kalox TM (a degraded EPDM polymer having a number average molecular weight determined to be in the range of between about 15,000 and about 20,000) was employed, upon curing no adhesion to either the top pan or to the bottom pan was observed.

The adhesion demonstrated in the composite of this invention is completely unexpected in view of the failure of such a closely related prior art polymeric material to adhere to a substrate after curing.

What is claimed is:

1. A method of insulating a plurality of rigid panels which are subjected to a high temperature paint treatment, said method comprising the steps of:
    adhering to said plurality of rigid panels an uncured insulating tape composed of (a) a major amount of an ethylene/propylene nonconjugated polyene terpolymer having a number average molecular weight of between about 500 and about 14,000 (b) between about 0.5 and about 5.0 parts by weight of curative, based upon the weight of said terpolymer, (c) between 0.1 and about 10.0 parts be weight of a blowing agent based upon the weight of said terpolymer, and (d) between 0 and about 200 parts by weight of a filter based upon the total weight of said terpolymer, to form an uncured insulated composite;
    conveying said uncured insulated composite into said high temperature paint treatment;
    heating said uncured insulated composite at temperatures high enough to activate said curative;
    curing and adhering said uncured insulating tape to said plurality of rigid panels, to form a cured composition; and
    cooling said plurality of rigid panels.

2. A method according to claim 1 further comprising the step of foaming said uncured insulating tape by heat actuation of said blowing agent during said heating step.

3. A method according to claim 2 wherein said foaming and curing steps occur substantially simultaneously.

4. A method according to claim 2 wherein said adhering step is conducted on rigid panels from the group consisting of vehicle doors, trunk lids, hoods and automotive body panels and wherein said foaming and curing steps effect a substantial sealing and insulating of said rigid panels.

5. The method of claim 1 wherein the molecular weight of said terpolymer is between about 4,000 and about 7,000.

6. The method of claim 1 wherein said uncured insulating tape includes a release film removably adhered to one side of said tape and wherein said adhering step further comprises placing said tape on said plurality of rigid panels such that the release layer may be removed.

7. The method of claim 1 wherein said blowing agent is azocarbonamide.

8. The method of claim 1 wherein said uncured insulating tape further contains an activating agent selected from the group consisting of zinc oxide, zinc bis(toluene sulfonic acid), potassium dodecene sulfonic acid, activated urea, stearic acid and polyurethane ether glycol.

9. The method of claim 1 wherein said curative is one or more materials selected from the group consisting of organic peroxide, sulfur, thiazoles, sulfenamides and dithiocarbamates.

* * * * *